United States Patent [19]
Fujii

[11] Patent Number: 4,687,323
[45] Date of Patent: Aug. 18, 1987

[54] ROTARY SUCTION DRUM

[75] Inventor: Teruo Fujii, Kyoto, Japan

[73] Assignee: Dainippon Screen Mfg. Co., Ltd., Kyoto, Japan

[21] Appl. No.: 833,584

[22] Filed: Feb. 26, 1986

[30] Foreign Application Priority Data

Mar. 7, 1985 [JP] Japan .................................. 60-46075
Sep. 4, 1985 [JP] Japan ................................ 60-195290

[51] Int. Cl.⁴ ............................................. G03B 27/60
[52] U.S. Cl. ......................................... 355/73; 355/76
[58] Field of Search ..................................... 355/73, 76

[56] References Cited

U.S. PATENT DOCUMENTS

| 2,814,233 | 11/1957 | Anander | 355/73 |
| 3,359,879 | 12/1967 | Hamlin | 355/73 |
| 3,451,754 | 6/1969 | Prew | 355/73 |
| 3,521,538 | 7/1970 | Escoli | 355/73 |
| 3,677,643 | 7/1972 | Sagawa | 355/73 |
| 3,700,302 | 10/1972 | Mohon et al. | 355/73 |

FOREIGN PATENT DOCUMENTS

| 8931382 | 5/1983 | Australia . |
| 1193308 | 9/1985 | Canada . |
| 0078376 | 5/1983 | European Pat. Off. . |
| 221897 | 8/1907 | Fed. Rep. of Germany . |
| 1276688 | 9/1968 | Fed. Rep. of Germany . |
| 3143342 | 5/1983 | Fed. Rep. of Germany . |
| 58-86546 | 5/1983 | Japan . |
| 59762 | 7/1947 | Netherlands .......................... 355/73 |

Primary Examiner—Monroe H. Hayes
Attorney, Agent, or Firm—Lowe Price LeBlanc Becker & Shur

[57] ABSTRACT

A rotary suction drum provided with a number of pores in the drum surface has its inside space divided into multiple sections by partitions, communicating at least one of the drum sections with a source of suction through a duct, the sections also being in communication with each other through apertures provided in the partitions. Valves are provided at the partition apertures for covering the apertures under centrifugal action when the rotary drum is rotated, the covering valve elements being located adjacent to the respective apertures.

7 Claims, 8 Drawing Figures

ROTARY SUCTION DRUM

BACKGROUND OF THE INVENTION

1. Field of the Invention

The present invention relates generally to a rotary drum for securing a sheet material thereon under suction, and more particularly to such a rotary drum as used in combination with a recording apparatus.

2. Description of the Prior Art

A rotary suction drum, which is used to secure a photosensitive material such as film or paper, on its own peripheral surface is known in the art. Such drums are mainly employed in combination with a recording apparatus. The drum of this kind includes a hollow cylinder in the peripheral surface of which fine holes are provided, the cylinder being rotatably driven and communicating with a suction unit. Sheet material placed on the cylinder surface is secured thereat under suction provided through the holes of the cylinder surface.

Recently, in line with the increase in the size of the sheet material dealt with, such rotary drum are becoming large. However, it is often necessary to record on a half-size sheet of photosensitive material, because it is disadvantageous to use a full-size sheet.

To secure such a half-size photosensitive material sheet on the cylinder surface, one procedure is to: mount the half-size photosensitive material on the cylinder surface, and simultaneously cover the remaining area of the cylinder surface (i.e. the area not covered by the half-size photosensitive material) by another sheet of material, such as used film, which is fastened to the cylinder surface by means of adhesive tapes, whereby the half-size photosensitive material is fixedly held by suction on the cylinder surface. However, this practice is labor-consuming, and residues of adhesive are likely to remain on the cylinder surface and cause trouble.

An improvement of the rotary drum has been proposed as is shown in the Japanese Laid-Open Utility Model Publication No. 59-141344. The explanation on the publication is as follows, with reference to FIG. 8:
A rotary drum 51 includes a number of fine holes 52 on the peripheral surface thereof and walls 53, 54 which define four chambers inside the drum 51. Each chamber communicates with a blower 55 through conduits 56 to which electromagnetic valves $V_1$, $V_2$ and $V_3$ are respectively provided which are selectively operatable. Photosensitive materials of various size can be effectively mounted on the peripheral surface of the rotary drum.

However, such an improvement still involves some disadvantages, one of which is that the joining of the conduits 56 connected to the drum 51 involves complicated work, and another is that the suction rate in the conduits 56 is likely to be reduced because of the fact that the conduits run around the drum. As a result, it takes a long time before the differential pressure required hold a photosensitive material on the peripheral surface of the drum 51 is obtained. These problems reduce the operational efficiency, and make the apparatus unsuitable for automatic film loading onto the drum.

SUMMARY OF THE INVENTION

The present invention is directed to solve the disadvantages pointed out above, and has for an object the provision of a rotary suction drum which effectively secures a sheet material, e.g. film, on its own peripheral surface under suction, regardless of the film size.

Another object of the present invention is to provide a rotary suction drum having a simplified construction, to provide thereby a trouble-free operation.

Other objects and advantages of the present invention will become apparent from the detailed description given hereinafter. It should be understood, however, that the detailed description of specific embodiment is by way of illustration only, since various changes and modifications within the spirit and scope of the invention will become apparent to those skilled in the art from this detailed description.

According to the present invention, the rotary suction drum comprises: a rotary cylinder, on the peripheral surface of which a film is to be mounted; at least one vertical wall for defining chambers which the cylinder, at least two openings being provided opposite to each other on the wall; a conduit connected to any one of the chambers and to a suction device; and movable valves provided on the wall for closing the openings.

Preferably, the rotary cylinder rotates at predetermined different speeds. When the film is supplied on the peripheral surface of the cylinder, the cylinder rotates at lower speed and, after the film is supplied the cylinder rotates at a higher speed suitable for recording an image on the mounted film.

According to one feature of the present invention, the respective valves provided on the wall comprise a movable plate that is rotatable or slidable so as to move to the corresponding position of the respective openings in response to the centrifugal force generated as the cylinder rotates. Thus, when a differential pressure is applied to the plate, the openings on the wall are airtightly closed by the plates.

According to another feature of the invention, the respective valves comprise: a first plate movably mounted on the wall, the first plate having a second opening smaller in diameter than the respective opening provided on the wall, the second opening being consistent with the opening provided on the wall when the first plate is moved to a position corresponding with a wall opening; a second plate provided on the first plate for closing the second opening; and at least one spring member provided between the first and second plates for biasing the second plate away from the first plate. The spring member secures a clearance for communication between the chambers. When the first plate is moved to the corresponding position of the first opening in response to the centrifugal force as the cylinder rotates, communication between the chambers is secured by the spring member which forms the clearance between the first and second plates. In this case, when a differential pressure is caused between the chambers, it is applied to the second plate and as well as the first plate, accordingly, the openings provided on the first plate and the wall are airtightly closed.

Other features and advantages of the present invention will become apparent from the following description taken in connection with the accompanying drawings.

DETAILED DESCRIPTION OF THE INVENTION

Figure 1:
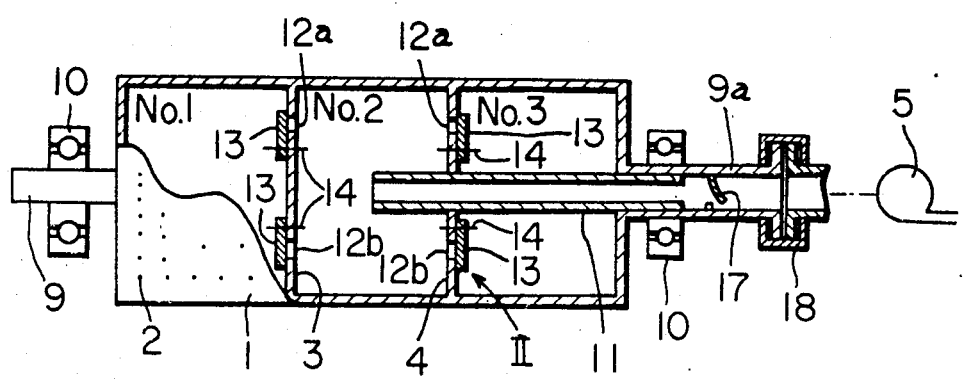
FIG. 1 is a cross-sectional view through a rotary suction drum embodying the present invention.

Referring to FIG. 1, a rotary cylinder 1 includes a number of fine suction holes 2 on its peripheral surface. The inside of the cylinder 1 is divided into three chambers denoted as No. 1, No. 2 and No. 3, respectively by vertical walls 3 and 4, these chambers being aligned along a rotary axis of the cylinder 1.

The cylinder 1 includes extended portions 9 and 9a at opposite ends thereof, whereby the cylinder 1 is carried on bearings 10 in such a manner that the cylinder 1 can rotate at high speeds. The reference numeral 11 denotes a conduit which is airtightly connected to the extended portion 9a, wherein the duct 11 is open in the chamber No. 2 with its other opening end communicating with a blower 5.

Each vertical wall 3, 4 is provided with openings 12a, 12b, respectively, through which the neighboring chambers are mutually communicated.

The reference numeral 13 denotes valves capable of swinging so as to close the openings 12a, 12b which are respectively located adjacent thereto. A valve 13 is pivotally connected to each of the walls 3, 4 by means of a shaft 14. Details of various suitable forms of the valve 13 are shown in FIGS. 2 to 7.

Figure 2:
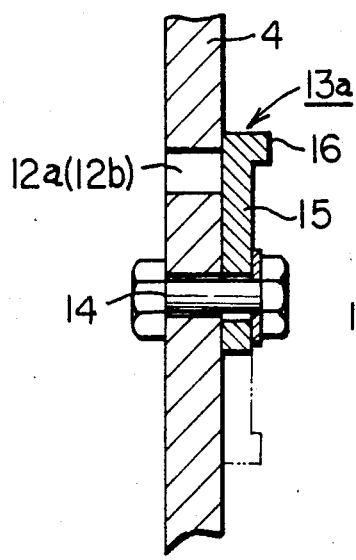
FIG. 2 is a fragmentary view, on a larger scale, showing the portion indicated by II in FIG. 1.

FIG. 2 shows the first embodiment of the present invention. Referring to FIG. 2, the valve 13a is formed into a fan-shaped flat plate 15 having a weight 16 at the bottom portion thereof. The plate 15 is rotatably mounted on the wall 4 at the upper portion thereof by a shaft 14. The bottom portion 16 is large enough to increase the weight at the bottom of plate 15 so that the center of gravity of the valve 13a is situated away from the shaft 14. When cylinder 1 is rotated at high speed, a centrifugal force acts on the valves 13a rotating plates 15 as well, thereby causing plates 15 to move to close the openings 12a and 12b. However, when the speed is low or the cylinder rotation is stopped, the valves 13a tend to position themselves about shafts 14 with the heavy bottom portions 16 located downward by gravity as shown in dotted lines in FIG. 2, thereby releasing the openings 12a from the valves 13a.

Even when the plate 15 is placed at a position such that the opening 12a is closed, as shown in FIG. 2, there is provided a clearance between the plate 15 and the wall 4 for allowing communication of air flow therethrough when a differential pressure does not act across the plate.

When a film is to be placed on cylinder 1, the film is wound around it by rotating the cylinder. At this stage, either one of the openings 12a, 12b is released from the corresponding valves 13a, thereby securing mutual communication among the chambers No. 1 to No. 3. Though the interior pressure in the respective chambers is kept negative by means of the blower 5, this mutual communication makes the interior pressure of the chambers substantially equal. Under this equal suction, the film is secured on the cylinder 1 through the suction holes 2. When the cylinder is rotated, the openings 12a and 12b are gradually closed by the valves 13a under centrifugal action. However, the closure by the valves 13a is not perfectly airtight for the reason below:

When the film is a full size sheet, i.e., large enough to cover all of the holes 2, the pressures in the respective chambers No. 1 to No. 3 are maintained constant, thereby producing no net force biasing any of the valves 13a into engagement with the walls 3 or 4. This ensures a small clearance between the valves and the walls.

On the other hand, when the film is a half-size sheet, i.e., one that covers only about half of holes 2, about half area of the cylinder surface on which the suction holes 2 are provided is not covered by the film. Hence air is admitted through these open holes to communicate with the chamber of the cylinder 1. As a result the chamber that is not covered by the film, for example, the chambers No. 1 and No. 3 will have nearly the same pressure as the ambient pressure, thereby producing a substantial difference in pressure as compared to the pressure in chamber No. 2. Owing to this differential pressure, the swinging valves 13c are so tightly pressed against the vertical walls 3 and 4 that air is not allowed to communicate from chamber to chamber through the closed openings 12a and 12b. This prevents the suction in the chamber No. 2 from being reduced.

The conduit 11 is provided with a check valve 17 which prevents a reduction of suction in the chambers, as could otherwise occur because of electrical failure or any other trouble. The check valve 17 can be replaced with a lead valve or a poppet. The reference numeral 18 denotes a labyrinth seal.

Figure 3:
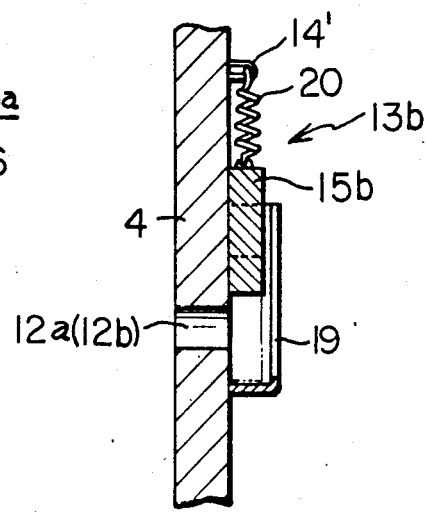
FIG. 3 is another fragmentary view, on a larger scale, showing a modified version of the portion indicated by II in FIG. 1.

Referring to FIG. 3, there is shown another embodiment of the present invention, in which a valve 13b includes a flat plate 15b which is slidably supported in a guide frame 19 by means of a spring 20, which is in turn fixed to a clasp 14'. The plate 15b is biased toward the rotation axis of the cylinder 1 at times when the centrifugal force does not act on the plate 15b. However, plate 15b is moved to the corresponding position of the opening 12b when the centrifugal force acts on plate 15b due to cylinder rotation. Thus the spring 20 is selected so as to enable the plate 15b to move mentioned as above. Even when the plate 15b is moved to the corresponding positon of the opening 12b, a clearance between the wall 4 and 15b is secured for permitting communication between the chambers until the differential pressure acts on the plate 15 to airtightly close the opening 12b by the plate 15b.

Figure 4:
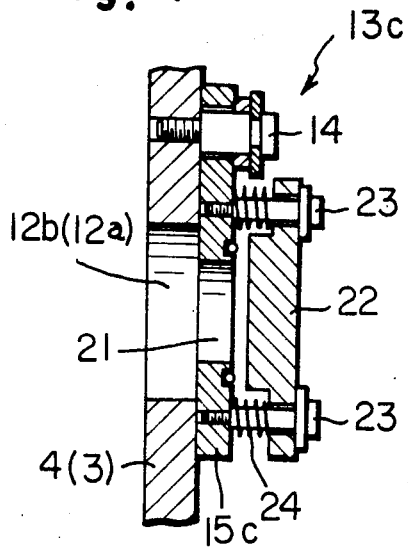
FIG. 4 is another fragmentary view, on a larger scale, showing a further modified version of the portion indicated by II in FIG. 1.
Figure 5:
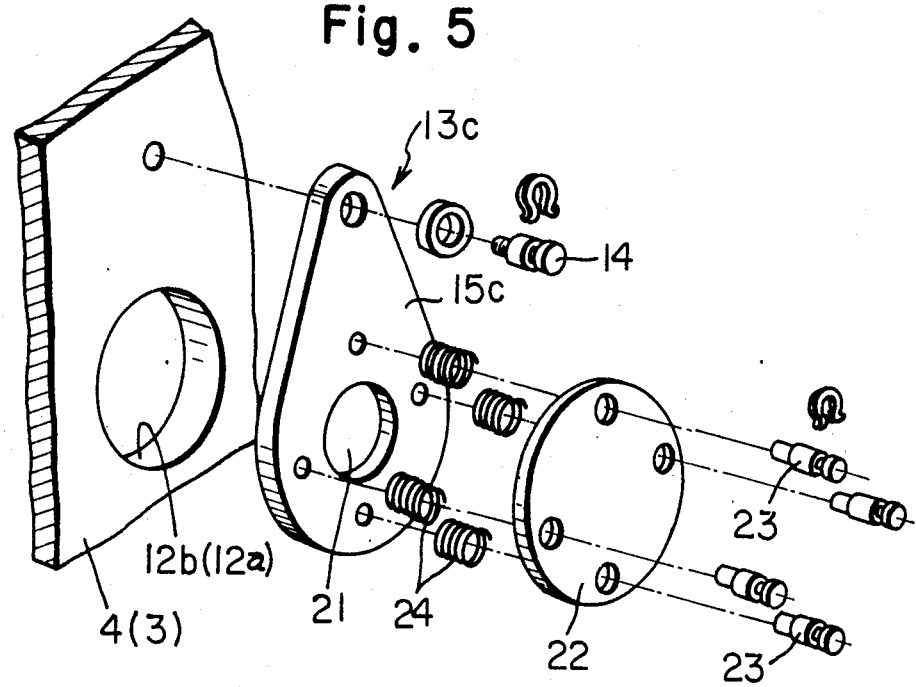
FIG. 5 is an exploded perspective view of the portion shown in FIG. 4.

Referring to FIGS. 4 and 5, there is shown another embodiment of the invention which is especially intended to secure the clearance at the valve when the differential pressure does not act between the chambers, and to prevent any air leak at the valve when the opening 12a, 12b is closed by means of the differential pressure. If there is an air leak at these openings a sufficient suction is not achieved, and the film is likely to slip off the cylinder under insufficient suction. This is because the air leak caused at valves makes the interior pressure substantially equal through the chambers No. 1 to No. 3.

The valve as shown in FIGS. 4 and 5 is particularly effective to secure the film on the cylinder surface without any air leak at the valves. Referring to FIGS. 4 and 5, the valve 13c includes a fan-shaped plate 15c on which an opening 21 smaller in diameter than the opening 12b provided on the vertical wall 4 is provided and a disk plate 22 which is mounted to the plate 15c by means of screws 23 so as to cover the opening 21. Between the plate 15c and the disc plate 22, four springs are located for biasing the plate 22 away from the plate 15c during times when a differential pressure is not present between the chambers. The fan-shaped plate 15c is rotatably mounted on the wall 4 by means of a screw 14, so that the openings 12b and 21 are consistent with each other when the plate 15c comes to the corresponding position of the opening 12b in response to the centrifugal force generated as the cylinder rotates. The springs 24 are selected so as to bias the disc plate 22 away from the plate 15c when a differential pressure is not present between the chambers. Airtight closing of the openings 12b and 21 is achieved by means of the plates 15c and 22, respectively when the differential pressure is caused. When a negative pressure is caused in a chamber No. 2, for example, around which a film is placed, the suction is strengthened and thus the film placed around the chamber No. 2 is fixedly secured on the cylinder surface.

Figure 6:
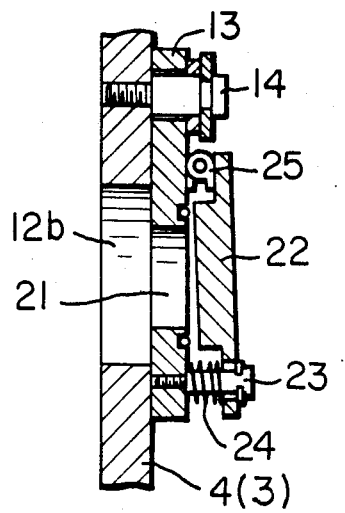
FIG. 6 is a still further modified version of the portion indicated by II in FIG. 1.
Figure 7:
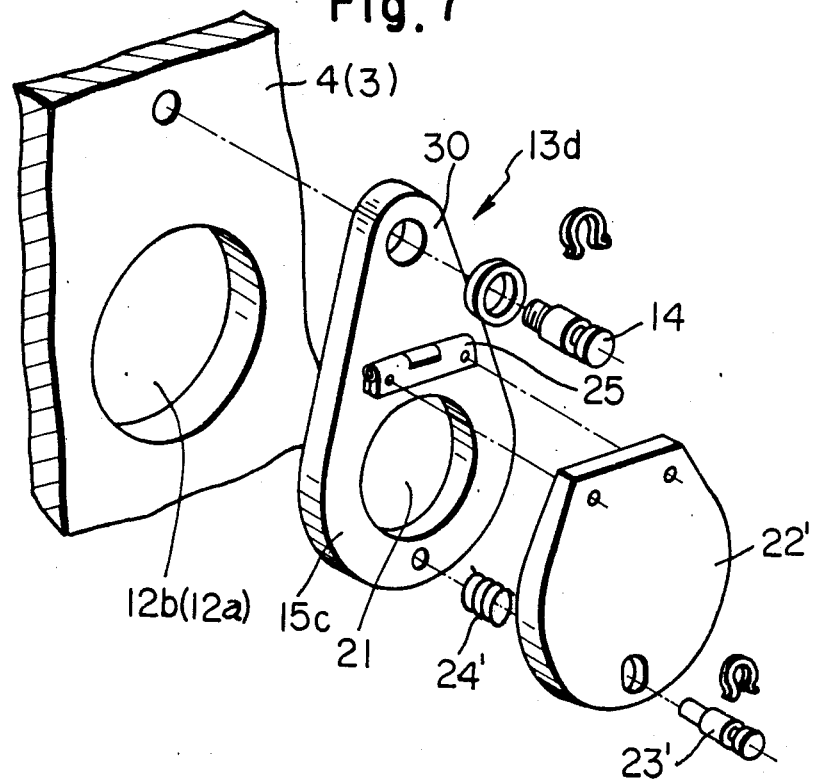
FIG. 7 is an exploded perspective view of the portion shown in FIG. 6.
Figure 8:
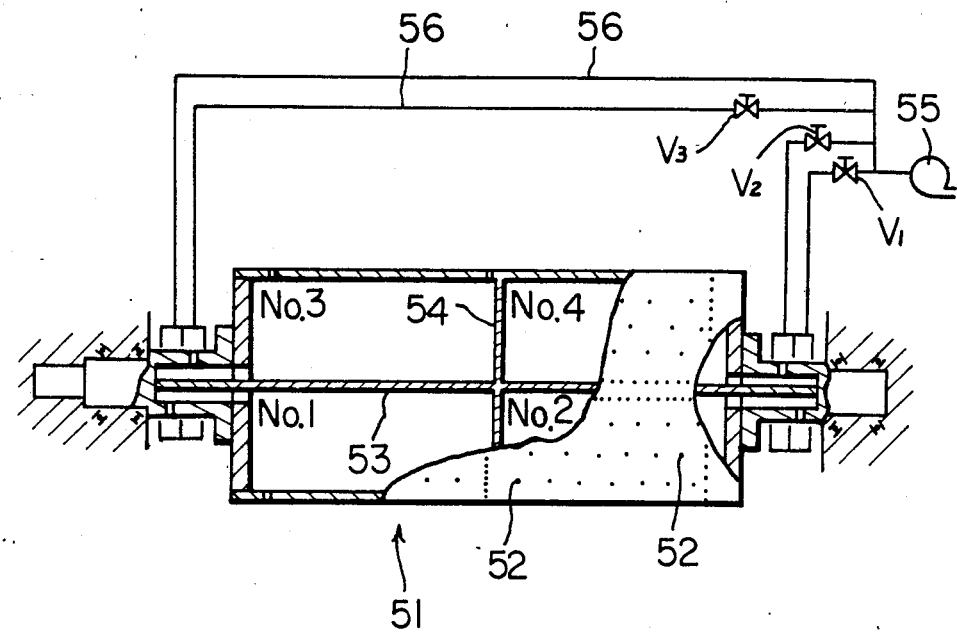
FIG. 8 is a cross-sectional view of a conventional rotary drum.

Referring now to FIGS. 6 and 7, another embodiment is shown, in which the valve 13d includes a fan-shaped plate 15c as described in FIGS. 4 and 5 and a partially fan-shaped plate 22' which is pivotally mounted on the plate 15c by means of a hinge 25. The plate 22' is biased away from the plate 15c by means of a spring 24' when the differential pressure is not caused between the chambers. The clearance between the plates 15c and 22"is defined by screw 23'. The fan-shaped plate 15c is rotatably mounted on the wall 4 by means of a screw 14 so that the openings 12b and 21 are located consistent with each other when a centrifugal force acts on the valve 13d as the cylinder rotates. The spring 24' is selected so as to bias the partially fan-shaped plate 22' away from the plate 15c when a differential pressure is not present between the chambers and to airtightly close the openings 12b and 21, respectively by means of plates 15c and 22' when a differential pressure is caused. When a negative pressure is caused in a chamber No. 2 for example, around which a film is placed, the suction is strengthened and thus the film placed around the chamber No. 2 is fixedly secured on the cylinder surface.

OPERATION

Initially, with the embodiment illustrated in FIG. 2, for example, a film is automatically supplied from an automatic film supply (not shown), while the chambers No. 1 to No. 3 are sucked by the blower 5. The suction applied to the chambers is adjusted so as to hold the film on the cylinder surface thereby. As the cylinder 1 rotates slowly, the film is held and wound around the cylinder surface, during which the chambers No. 1 to No. 3 communicate through either openings 12a or 12b, since without rotation the centrifugal force does not act on the valves 13, which valves 13 are rotated according to the gravity. After the film is placed on the cylinder surface, the rotation of the cylinder is started and increased so as to be at a speed suitable for recording an image on the film by a recording head (not shown), during which the centrifugal force acts on the valves 13 and thus all the valves are positioned at the corresponding positions of the openings 12c and 12b.

In the case that a full-size film is used, all the suction holes 2 on the cylinder surface are closed by the film, a sufficient differential pressure is not caused between the chambers, and thus the valves 13 are not airtightly closed but the respective chambers communicate through the clearances provided at respective valves. Therefore, a full-size film is fixedly secured on the cylinder surface during recording.

On the other hand, in the case that a half-size film is used and is placed on the cylinder surface of chamber No. 2, for example, all the suction holes 2 of the chamber No. 2 are closed by the film and the holes 2 of the chambers Nos. 1 and 3 are open to air. Therefore, a differential pressure is caused between the chamber No. 2 and the chambers Nos. 1, 3, by which the clearance provided at respective valves 13 is tightly closed by the differential pressure. In this way, the communication between the chamber No. 2 and the chambers Nos. 1, 3 is airtightly closed, and thus the half-size film is fixedly secured on the cylinder surface of the chamber No. 2.

As mentioned above, the rotary suction drum according to the present invention secures a film fixedly and safely on the cylinder surface irrespective of film size and, furthermore, this is automatically performed.

What is claimed is:

1. An apparatus for mounting a sheet of photosensitive material on the peripheral outer surface of a rotary suction drum, comprising:
   a rotary cylinder rotatable at predetermined different speeds;
   at least one vertical wall provided inside said rotary cylinder, said wall defining chambers within the cylinder, with said wall having at least two openings provided opposite to each other therein;
   a conduit connected to any one of said chambers for applying suction to said chambers;
   suction means connected to said conduit for applying suction therethrough to the chamber; and
   valves provided on said wall for closing said openings, said valves being movable to the corresponding respective positions of said openings as said rotary cylinder rotates to cause a centrifugal force to act on said valves, said valves being urged toward the wall to airtightly close said corresponding openings by a differential pressure, caused by said suction, between the chamber around which the film is placed and the chamber around which no film is placed.

2. An apparatus according to claim 1, wherein:
   one of said valves comprises a plate rotatably provided on said wall around a shaft, said plate being movable to the position of the corresponding opening in response to the centrifugal force as the cylinder rotates, the clearance between said plate and the adjacent wall being held until a sufficient differential pressure is applied to said plate.

3. An apparatus according to claim 2, wherein:
   one of said valves further comprises a weight provided at a portion of said plate.

4. An apparatus according to claim 1, wherein:
   one of said valves comprises a plate slidably provided on the wall, biasing means connected to said plate for biasing said plate away from the position of the corresponding opening, anchor means for anchoring said biasing means on the wall, and guide means for supporting said plate therein;
   said plate being movable to the position of the corresponding opening in response to the centrifugal force generated as the cylinder rotates, the clearance between said plate and the wall being held until a sufficient differential pressure is applied to said plate.

5. An apparatus for mounting a photosensitive material on the peripheral surface of a rotary suction drum, comprising:
 a rotary cylinder rotatable at predetermined different speeds;
 at least one vertical wall provided inside said rotary cylinder, said wall defining chambers within the cylinder, with said wall having at least two first openings provided opposite to each other therein;
 a conduit connected to any one of said chambers for applying suction to said chambers;
 suction means connected to said conduit for applying suction therethrough to the chamber; and
 valves provided on said wall for closing said openings, respective one of said valves including a first plate movably mounted on the wall, said first plate having a second opening small in diameter than the corresponding first opening, said second opening being consistent in position with the first opening when said first plate is moved to the position of the corresponding first opening, a second plate provided on said first plate for closing said second opening, and biasing means provided between said first and second plates for biasing said second plate away from said first plate.

6. An apparatus according to claim 5, wherein:
 said first plate has a fan-shaped form which has extent large enough to cover the first opening when the first plate is moved to the corresponding position of the corresponding first opening, said first plate being rotatably mounted on the wall.

7. An apparatus according to claim 5, wherein:
 said biasing means is selected so as to enable the second plate to be biased away from the first plate when a differential pressure is not applied thereto and to be urged onto the first plate when said differential pressure is applied thereto.

* * * * *